May 27, 1947. G. E. WHITE 2,421,228
HOSE COUPLING
Filed Oct. 30, 1944

INVENTOR.
Gilbert E. White
BY Chester W Brown
Attorney

Patented May 27, 1947

2,421,228

UNITED STATES PATENT OFFICE 2,421,228

HOSE COUPLING

Gilbert E. White, Milwaukee, Wis.

Application October 30, 1944, Serial No. 560,942

2 Claims. (Cl. 285—175)

This invention relates to hose coupling.

An object of this invention is to provide a coupling which is simple to connect and disconnect and which automatically seals the connection against leakage by reason of the pressure exerted thereon from the liquid flowing therethrough.

Couplings of which I am aware have been complicated and difficult for the average person to manipulate where such are intended to give satisfactory service. Furthermore, they are expensive and not easily repaired. Those couplings which are of the simpler structures do not automatically seal the joint and require considerable force to properly clamp the sealing washers.

The following description of my invention will make it clear that I have devised a combination which eliminates all of the criticisms of devices of which I am aware.

Figure 1:
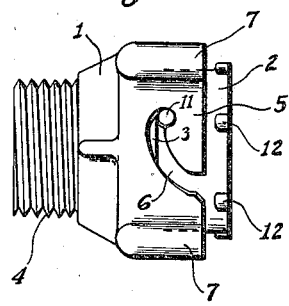
Fig. 1 is a side view of my invention.
Figure 2:
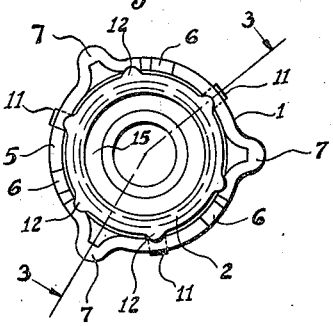
Fig. 2 is an end view taken from the right of Fig. 1.
Figure 3:
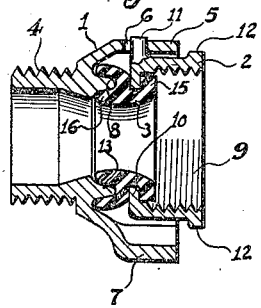
Fig. 3 is a sectional view taken on the line 3—3 of Fig. 2.
Figure 4:
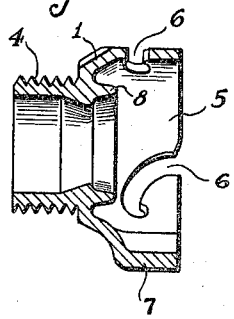
Fig. 4 is a view similar to Fig. 3 with one of the parts separated.
Figure 5:
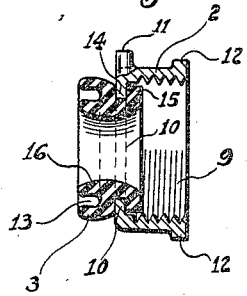
Fig. 5 is a view similar to Fig. 3 of the other part.
Figure 6:
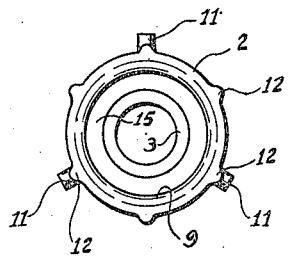
Fig. 6 is an end view of Fig. 5 taken from the right of Fig. 5.

The coupling comprises but three parts, a male coupling element 1, female coupling element 2, and packing washer 3. The element 1 is threaded externally at 4 for engagement with the usual female connection on a hose (not shown). The element 1 is also provided with an enlarged cylindrical socket 5 having a plurality of bayonet slots 6 and radial lugs 7. Internally the element 1 is provided with cylindrical shoulder 8.

The element 2 is provided with an internally threaded portion 9 for engagement with a male hose connection not shown. An internally projecting flange 10 is provided at one end which is also provided with locking lugs 11 receivable in the bayonet slots 6 of element 1. The opposite end of element 2 is provided with a series of external lugs 12.

The packing washer 3 may be made of rubber or any suitable resilient material and comprises a portion having an annular groove 13 for receiving the cylindrical shoulder 8 on the element 1. Intermediate its ends, the washer 3 is provided with an annular groove 14 receiving the internal flange 10 on the element 2 and in effect providing a flange 15 seated on the flange 10.

From the foregoing it will be apparent that the element 2 and washer 3 comprise one of the units of the coupling. When this unit is connected with the element 1 and turned so as to position the locking lugs 11 as indicated in Fig. 1, then the washer 3 is compressed upon the shoulder 8 and thus seals the connection. However, in addition to the sealing by compression, the inner wall portion 16 of the groove 8 on the washer 3 will, under pressure of fluid passing through the coupling, be forced outward against the inner surface of the shoulder 8 and prevent the fluid from passing through the joint of the coupling.

The flange 15 on the washer 3 will also be forced by fluid pressure into firm contact with the flange 10 on element 2 and further seal the joint, such seal being more effective with increased fluid pressure. Pressure on the flange 15 will also tend to force the flange 10 more firmly against the portion between it and the annular shoulder 8 on element 1. Also, pressure on the internal wall of the washer will force the washer into firm contact with the inner wall margin of the flange 10.

Obviously, as the pressure of the fluid increases, the flange 16 will increase its pressure on the shoulder 8. In other words, the effectiveness of the packing washer is not impaired by an increase of fluid pressure but, rather, is enhanced.

From the foregoing it will be apparent that I have provided a simple coupling which is easy to connect and acts to effectively seal the joint automatically upon completing the connection and application of fluid pressure to the washer.

I claim:

1. A coupling comprising a socketed member having an externally threaded end, the opposite end having bayonet-like slots; an annular axially projecting flange integral with and intermediate the ends of said socket member; an insert member projecting into said slotted end and having an internal thread at one end, an inner flange at the other end, and locking lugs engaged in said slots; and a resilient packing washer having an annular groove receiving said inner flange and a second annular groove extending axially and receiving said annular axially projecting flange in said socket member, said washer being clamped between said flanges and the walls thereof embracing said flanges.

2. A coupling comprising telescopic members having interacting releasable locking portions, one of said members having an annular axially projecting flange integral with and intermediate the ends of said one member, said axially projecting flange disposed within said one member, the other of said members having an inwardly projecting flange disposed within said one member in axially spaced relation to said axially projecting flange, and a resilient packing washer having an annular groove receiving said inwardly projecting flange and a second annular groove extending axially and receiving said axially projecting flange, said washer being clamped between said flanges and the walls thereof embracing said flanges, said members each being threaded for connection with hose or the like.

GILBERT E. WHITE.

REFERENCES CITED

The following references are of record in the file of this patent:

UNITED STATES PATENTS

| Number | Name | Date |
|---|---|---|
| 692,795 | Moyle | Feb. 4, 1902 |
| 1,890,011 | Wirz | Dec. 6, 1932 |
| 263,415 | Lightburne | Aug. 29, 1882 |